United States Patent [19]

Ng

[11] Patent Number: 4,998,118
[45] Date of Patent: Mar. 5, 1991

[54] LED PRINTHEAD WITH POST LENS OPTICAL FEEDBACK AND METHOD OF CONTROLLING SAME

[75] Inventor: Yee S. Ng, Fairport, N.Y.

[73] Assignee: Eastman Kodak Company, Rochester, N.Y.

[21] Appl. No.: 375,159

[22] Filed: Jul. 3, 1989

[51] Int. Cl.$^5$ .................. G01D 15/14; G02B 27/14
[52] U.S. Cl. ........................ 346/107 R; 346/160; 350/171
[58] Field of Search .............. 346/107 R, 108, 160; 358/300, 302; 350/173

[56] References Cited

U.S. PATENT DOCUMENTS

| | | | |
|---|---|---|---|
| 2,735,337 | 2/1956 | Frischmann | 350/173 |
| 2,809,555 | 10/1957 | Kossel | 350/173 |
| 3,787,888 | 1/1974 | Haskal | 346/108 |
| 4,757,327 | 7/1988 | Henzi | 346/107 R |
| 4,855,760 | 8/1989 | Kanayama | 346/107 R |
| 4,885,597 | 12/1989 | Tschang et al. | |

Primary Examiner—Bruce A. Reynolds
Assistant Examiner—Scott Rogers
Attorney, Agent, or Firm—Norman Rushefsky

[57] ABSTRACT

An LED printer apparatus or the like and method of controlling same is described wherein a sensor is provided at the focal plane of a lens means used to focus light from the LED's onto a film. This allows the sensor to provide corrections during actual printing operations. In response to the light sensed, adjustments are made by altering drive current to the LED's and/or changing the duration of an exposure period.

33 Claims, 5 Drawing Sheets

LED PRINTHEAD WITH POST LENS OPTICAL FEEDBACK AND METHOD OF CONTROLLING SAME

BACKGROUND OF THE INVENTION

1. Field of the Invention

The invention is directed to non-impact printer apparatus and methods of controlling same and particularly to those non-impact printers employing a plurality of recording elements emitting light for recording upon a photosensitive recording medium.

2. Description of the Prior Art

In the prior art as exemplified by U.S. Pat. No. 3,850,517, light-emitting diode (LED) arrays for use in printing are described. Specifically, printing may be accomplished by selectively turning selected LED's on or off to modulate the charge upon a photosensitive recording medium such as photographic film or upon an electrostatically charged photoconductor. In the case of the photoconductor, the modulation of the electrostatic charge may be developed with appropriate charged toners and a permanent record made by transferring and fusing the toned image to a receiver sheet such as plain paper, for example. In order to provide image quality that is satisfactory, it is required that the amount of light used to create each pixel (picture element) of image information be controlled so that exposure upon the recording medium will not be over or underexposed. To this end, the aforementioned patent provides a prism with a linear photocell in the exposure path. A portion of the light reaches the photocells and another portion impinges upon the recording medium. The LED's are driven sequentially; i.e., during a period for exposing one line of pixels, i.e., one is on and then turned off and then the next LED turns on. The electronic controls determine when enough light has impinged upon the photocell, and hence the recording medium, and turns the LED off and the next LED to be illuminated is turned on and so on. A problem with this type of printer is that it would be desirable to record a line of pixels simultaneously. In order to do so with the described printer, such would require a timing circuit for each LED where thousands of LED's on a printhead are typical.

U.S. Pat. No. 4,780,731, the contents of which are incorporated herein by this reference, describes an LED printhead where control over LED activation times is made electronically. Photoelements are moved into position either by traversing one across the printhead from LED to LED or by swinging an entire assembly of photoelements into position. The photoelements measure LED light output during periods when printing is not occurring and determine the need for adjustment of LED activation times. As noted in this patent, the required activation time for each LED changes during the life of the LED printhead; i.e., aging effect, and also changes dependent upon the operating temperature of the printhead.

A problem with this prior art printer apparatus is that in measuring the light output of the LED's, measurements are not made at the focal plane of the lens. Because of this, one is required either to make the measurements for each LED one at a time to avoid cross-talk or to remove the recording medium and move the photosensor into position at the focal plane. The latter is very undesirable, particularly when corrective measurements are to be made frequently during the life of the printhead.

The objects of the invention are therefore to overcome the disadvantages noted in the prior art.

SUMMARY OF THE INVENTION

The above and other objects are accomplished by a non-impact printer apparatus including a plurality of light-emitting elements, lens means for focusing light from said emitters to a photosensitive film, a photosensitive film located at a focal plane of the lens, sensor means for sensing the light output of the elements and for adjusting the light output of the elements in response to the light sensed and the improvement comprising wherein the sensor means is also located at the focal plane of the means. The invention is further realized by a method of printing employing a plurality of light-emitters for recording on a photosensitive film, said method comprising the steps of generating electrical currents to selectively energize said light emitters for emitting light for producing a recording on said film; imaging light from said emitters onto the film; simultaneously imaging light from said emitters upon a light sensing means and generating signals related to the intensity or amount of light sensed by said sensing means; and in response to these signals adjusting the level of current and duration of an exposure period for energizing an emitter.

BRIEF DESCRIPTION OF THE DRAWINGS

With reference to FIGS. 1 and 4a and 4b, the printhead 20 is provided with a multiplicity of energizable point-like radiation emitters or sources 30, preferably light-emitting diodes (LED's). Optical means 29 may be provided for focusing light from each of the LED's onto the photosensitive surface of the recording medium. The optical means preferably comprises an array of optical fibers such as sold under the name Selfoc, a trademark for a gradient index lens array sold by Nippon Sheet Glass, Limited. Due to the focusing power of the optical means 29, a row of emitters will be imaged on a respective transverse line on the recording medium.

The printhead 20 comprises a suitable support with a series of LED chips mounted thereon, each LED chip supporting a plurality of LED's formed thereon. LED chips are arranged end-to-end in a row so that the LED's (only two of which are shown) extend across the width of the web 11 in a single row. Associated with each LED is a driver circuit 31 to provide current from a power source P to the LED for illuminating same for a predetermined time period required for forming a pixel or recording dot on the web 11. The duration of this on time to which an LED is enabled is determined by a data signal. The data signal for each LED comprises a multi-bit signal that is representative of the pixel size or grey scale density to be recorded by the LED on a photosensitive web or drum located at the "film plane". The use of five bits of data for each pixel allows for 32 pixel size variations (including no size, i.e., no illumination by the LED). For each LED five serial shift registers (only three of which 32a, 32b and 32e are shown) are used to store each of the data bits. Rasterized data, D'$_0$–D'$_4$, in the form of binary logic signal 1's or 0's are serially shifted down each of the shift registers 32a–32e under control of clock pulses until all shift registers are full. A latch signal then enables a five-bit latch register 33 associated with each LED to latch the output of the shift registers. The multi-bit output of the latch registers 33 are now compared in a comparator 37 with a descending count from an up/down counter 40 that is under clock control. The counter will count down from decimal 32. When there is a match between the outputs of the counter 40 and the five-bit latch register 33 for that LED, a latch 36 is enabled that causes the current driver 31 to initiate current to the respective LED 30 from power supply P. A circuit substantially similar to the circuit shown in FIG. 3 is described in U.S. Pat. Nos. 4,799,071 and 4,750,010. With reference to FIG. 4a, the means for providing data signals to the printhead 20 is shown and comprises a data source 19 which may be a computer, word processor, image scanner, etc. This data along with appropriate clock synchronizing signals, is fed to a conventional raster image processor or other known image processor 38 which processes the incoming digital coded signals into digital rasterized image data signals suitable for forming the appropriate pixel size mandated by the image data signal during a production run or print job.

The three-bit rasterized image data signal $D_0$, $D_1$, $D_2$ is input to a look-up table memory device 39 which transforms the 3-bit grey level data signal into a 5-bit data signal. The rasterized image data signals for each LED is also input to a circuit which may comprise a microcomputer 49 or logic circuit that, in addition to providing the necessary timing or clock signals, functions in accordance with a program for which a flowchart is provided in FIG. 5.

Figure 1:
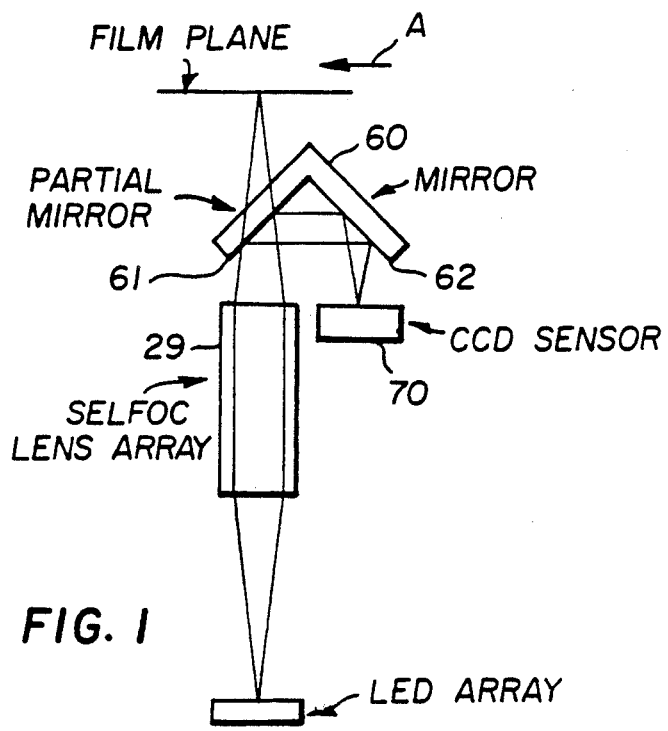
FIG. 1 is a schematic illustration of a non-impact printer in accordance with one embodiment of the invention.
Figure 4A:
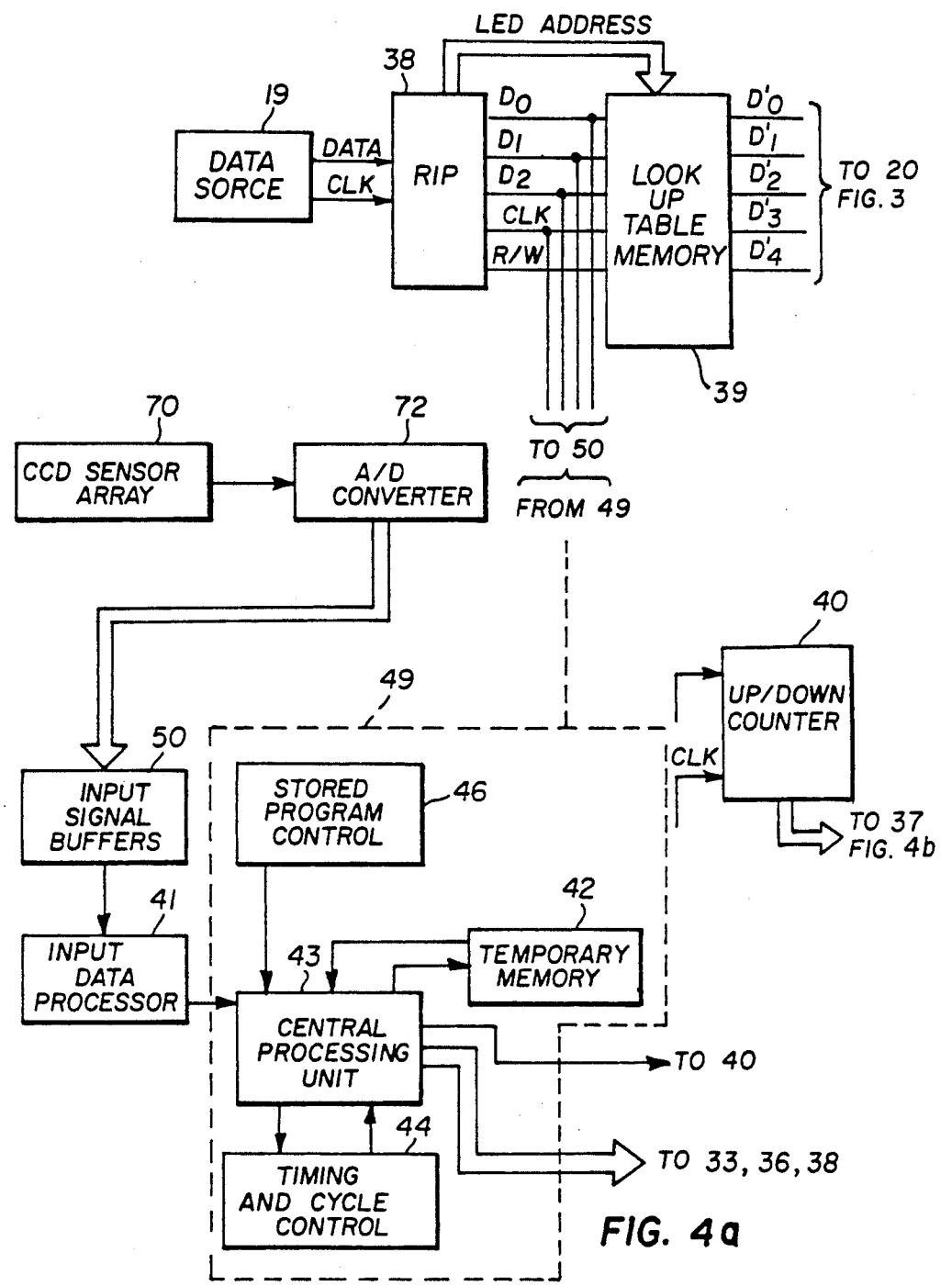
FIGS. 4a and 4b are schematics of an electronic circuit for use with the printers of FIGS. 1-3.
Figure 4B:
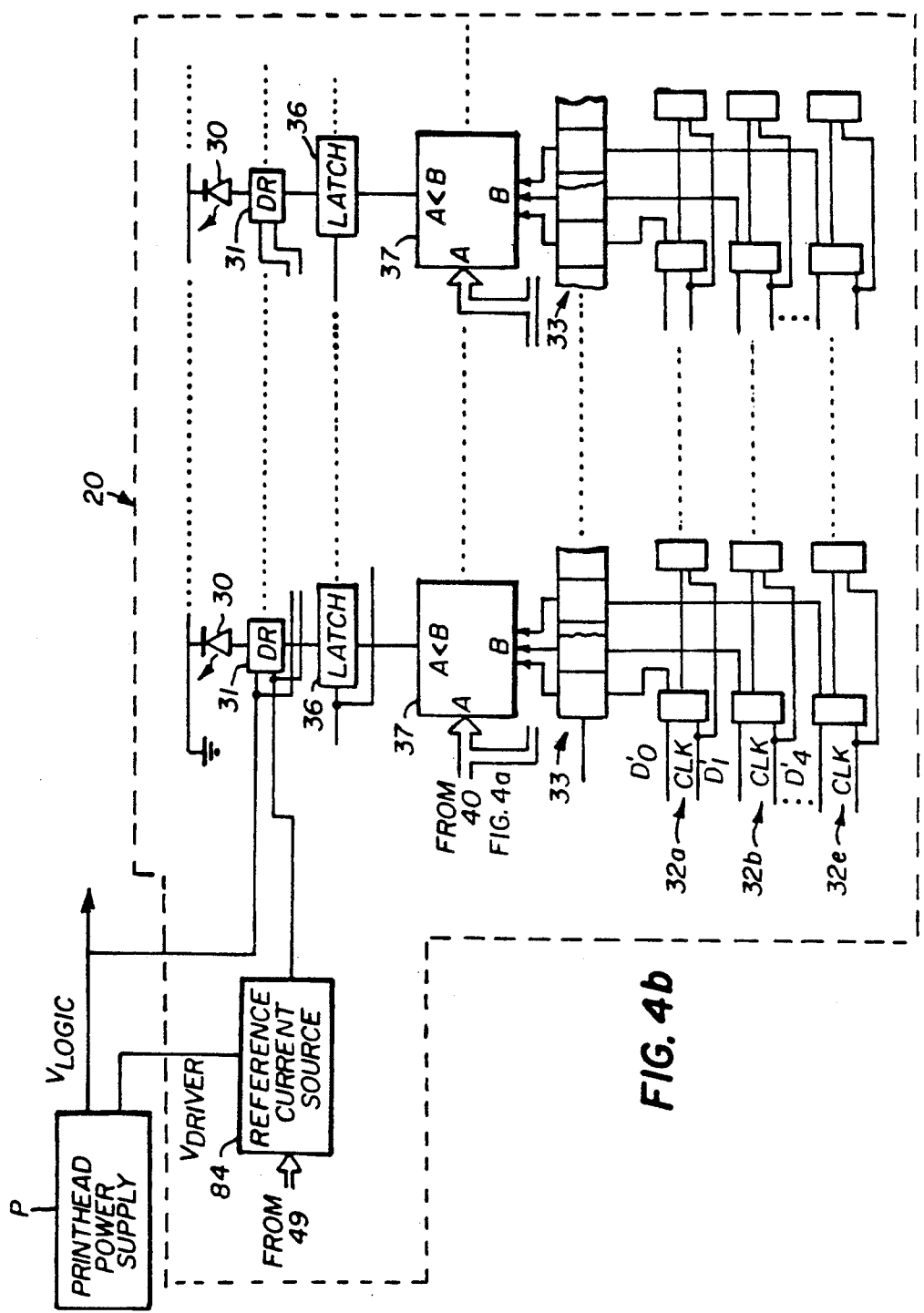
Figure 5:
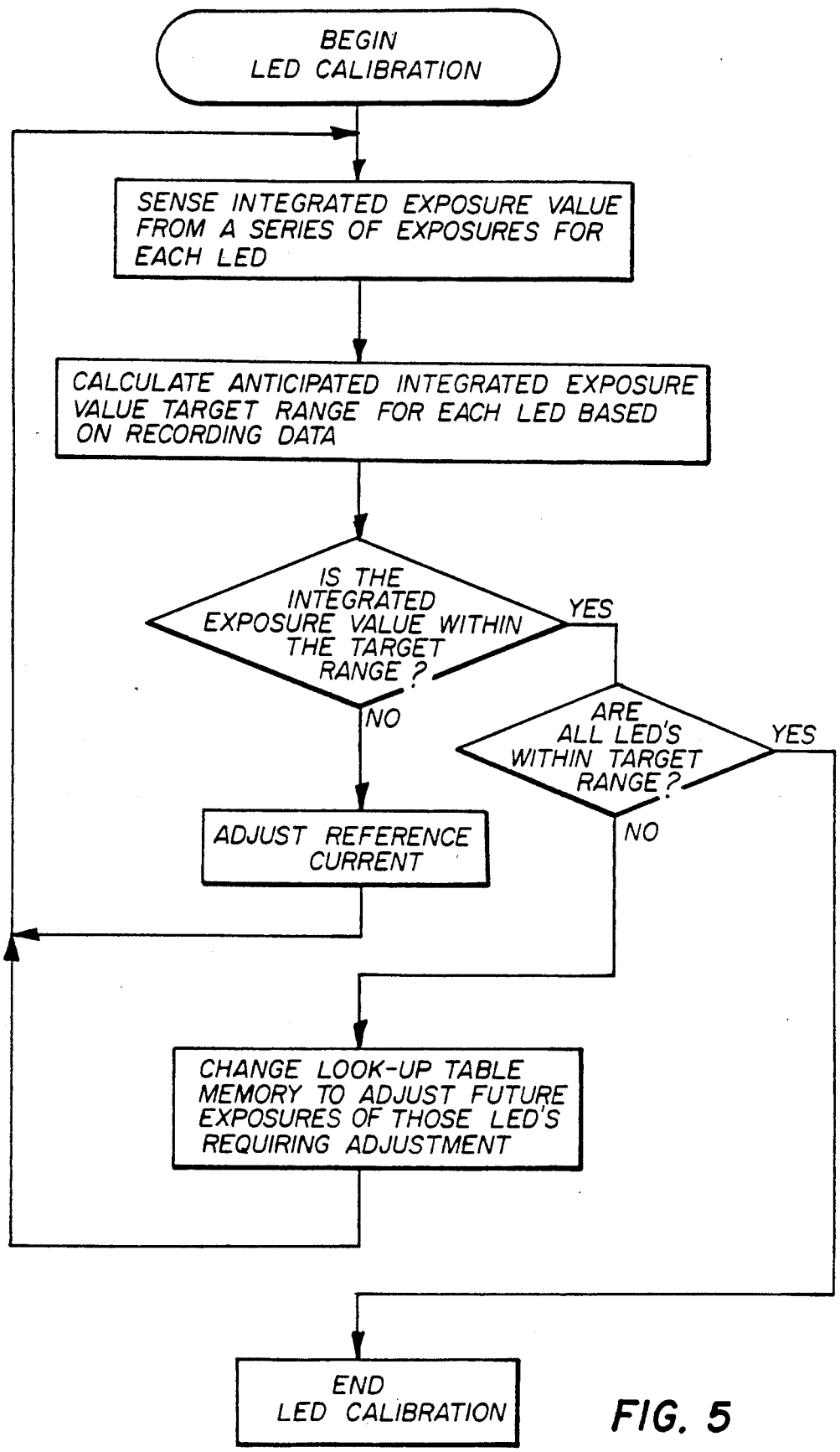
FIG. 5 is a flowchart of a calibration procedure for use with the printer apparatus of the invention.

With reference to FIG. 1, the LED array as shown is arranged at one focal plane of the Selfoc lens 29 (object plane) and at the other focal plane (image plane) there is located a photosensitive film such as a photoconductor driven in the direction of the arrow A by means not shown. A roof mirror 60 is supported as shown and has one leg 61 thereof coated with a partially reflecting mirror with the other leg 62 coated with a fully reflecting mirror. A portion of the light from the LED array and focused by the Selfoc lens is transmitted straight through the roof mirror leg 61 and impinges upon the film to provide an imagewise exposure of same. The remainder of the light is reflected from this one leg of the roof mirror to the other and further reflected to a charge coupled device (CCD) sensor array 70. A series of exposures recorded on the CCD sensor array are converted to a corresponding digital signal by an A/D converter 72 (FIG. 4a) and input to the microcomputer 49. With reference now also to FIG. 5, the rasterized data is input to microcomputer 49 through input signal buffers 50 and input data processor 41. The microcomputer includes a central processing unit 43, stored program control 46, temporary memory 42 and timing and cycle control unit 44. In accordance with a program in stored program control 46, the microcomputer determines whether or not a series of exposures sensed for each LED falls within an anticipated range. For example, the microcomputer takes ten lines of integrated readings by CCD sensor array 70 for a particular LED. The microcomputer, also knowing the desired grey level exposure for each of these ten lines from data $D_0$–$D_2$ also input to the microcomputer, calculates an expected range for the integrated sensor reading for that LED. This is done for each LED in the array. For those LED's not illuminated during the print job, the microcomputer can provide appropriate simulated data to these LED's during, say, an interframe period which is a period between recording of document pages. The use of ten readings is exemplary, of course, one reading may be taken but it is believed that combining more readings will provide more meaningful information. If most of the LED's sensed exposure values fail to fall within the target range, the current to all LED's may be adjusted by a signal from the microcomputer to a reference current source 84. Source 84 comprises a master current mirror circuit to which the current driver 31 for each LED is slaved. Changing the current passing through the reference current source 84 causes a like or proportional change in current through each LED driver when the LED is activated by an appropriate signal for it to turn on as described above. Description of one suitable reference current source is provided in U.S. application Ser. No. 290,212, filed Dec. 27, 1988, in the name of Pin S. Tschang et al, the contents of which are incorporated by this reference. After this change the exposures from the LED's are again reviewed to determine if most fall within the target range. If they do, then special adjustment for those not falling within the target range is provided. In this regard, adjustments are made in the look-up table memory 39 for those LED's requiring same. Note that in this example five data bits are used for each LED to define an 8-level grey level exposure as well as an exposure correction value. Further description relative to a grey level printer employing a grey level signal that incorporates grey level information and correction information is provided in U.S. application Ser. No. 290,002, filed Dec. 27, 1988, filed in the names of Hieu T. Pham et al, the contents of which are incorporated herein by this reference. When these corrections are made in the look-up table for each of these LED's failing to meet the target value, the calibration of all LED's is reviewed again. This process repeats until all LED's are deemed to be calibrated. A calibration operation is then commenced at a next occasion deemed to be appropriate for initiating a calibration operation such as by sensing a change of temperature of the printhead or the calibration process can be continuous, or some other combination of factors used to initiate a calibration.

Figure 2:
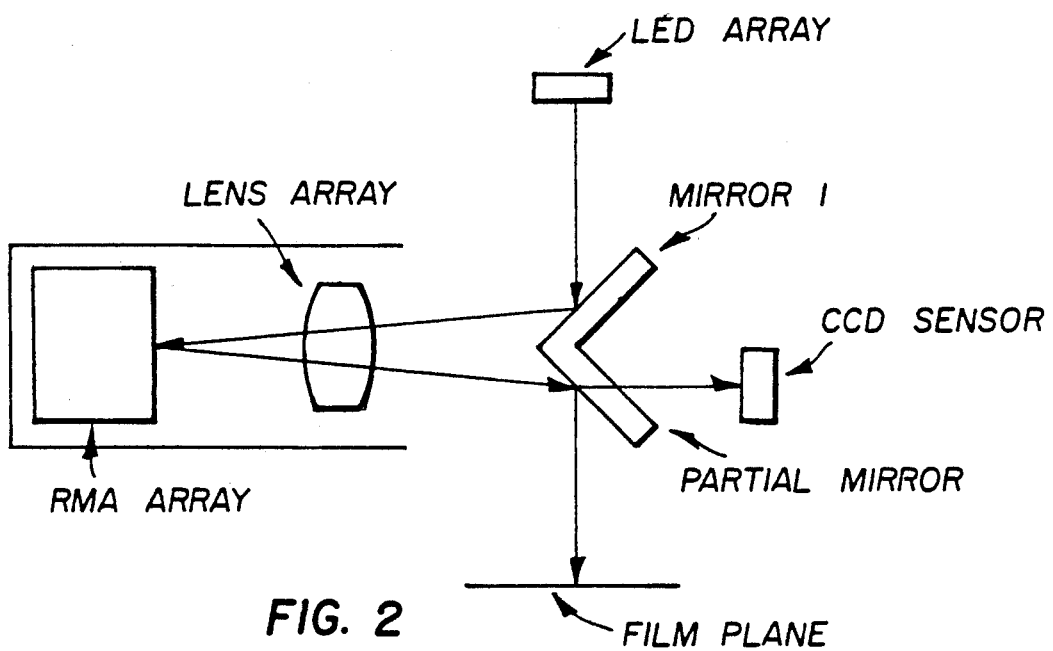
FIG. 2 is a schematic illustration of a non-impact printer in accordance with a second embodiment of the invention.

With reference now to FIG. 2, the Selfoc lens is omitted in this embodiment and a roof mirror array (RMA) and lens array are provided and form a roof mirror lens array (RMLA). Light from the LED's are reflected from a first mirror into the RMLA. The light is reflected back from the RMLA and reflects off a second mirror in focus to the film plane located at the focal plane of the lens array. The second mirror is a partial mirror and allows a portion of the light to impinge upon a CCD that is also the focal plane of the imaging lens array. The signals from the sensor are employed in similar manner to those described above for the embodiment of FIG. 1 to control the light output of the LED's.

Figure 3:
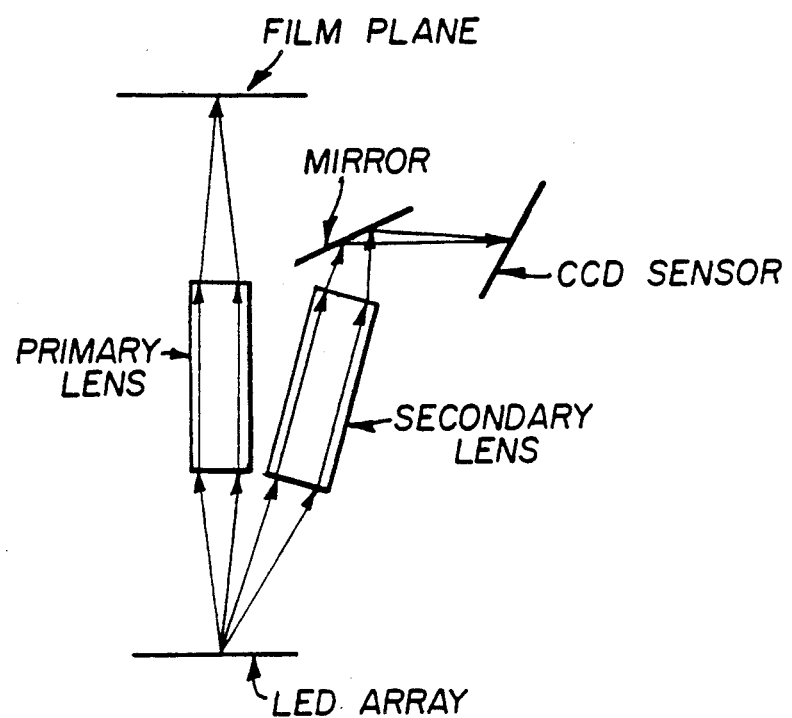
FIGS. 3 is a schematic illustration of a non-impact printer in accordance with a third embodiment of the invention.

With reference now to the alternative embodiment of FIG. 3, a first primary Selfoc lens is positioned between the LED array and the film to focus light from the LED's onto the film located at the focal plane of the lens. A second Selfoc lens is also provided at an angle to the vertical and collects light not collected by the first lens. Light collected by the second lens is reflected from a mirror and imaged upon a CCD sensor array located at the focal plane of the lens. With this embodiment, all the light collected from the first lens is used for imaging upon the film. In addition, there may be more light available in this embodiment for detection by the CCD sensor array since in the previous embodiments described, the amount of light available to the sensors are those portions passed through the partial mirrors. Note that the first lens may be angled relative to the vertical to provide room for the second lens.

The relationship between the light reaching the sensors relative to the light collected by the first lens and reaching the film plane may be accounted for in a translation table forming part of the look-up table since the LED's are Lambertian light emitters. This translation table is provided during factory calibration of the printhead using a scanner to detect the light that would fall on the film plane. Alternatively, the CCD sensor may be rotated to the film plane to make this calculation. Thus, the same sensor is used in this initial calibration for forming the translation table, eliminating discrepancies between sensors.

With the calibration scheme as described herein, it is possible to only select certain LED's for calibration. For example, calibration may be made of only those LED's that due to their own characteristics or of their drivers tend to have a relatively lower light output and thus relatively longer exposure times. Additionally, the data to be printed may be passed into a buffer while the microcomputer analyzes the data for the next page to be printed. This analysis can determine which LED's will be used and provide correction during printing of this page for those LED's that will see the most use.

Still other modifications to the apparatus of this invention include using a higher resolution CCD sensor than the LED (like a 1200 dpi CCD sensor with a 400 or 600 dpi LED array) so one may compensate for differences in thermal expansion between GaAs LED material and silicon CCD sensors. Another modification is to use a thermal-electric cooler/heater approach for both the LED and the CCD sensor array to compensate for differences in thermal expansion. And yet another modification is to use a look-up table approach to compensate for the actual location of the LED pixel with respect to the CCD sensor due to thermal expansion differences (since there will be thermal feedback from the printhead anyway). Still other approaches may be to use lower cost integrating large area silicon sensors in place of a CCD array. The large area sensor can sense a combined exposure of groups of LED's and the microcomputer then can determine whether exposures for the LED's require an adjustment in, say, drive current to the LED's due to aging or thermal changes. Alternatively, several of these large area sensors may be placed in a line at the focal plane of the lens as described above to be in position so that light from any LED will be sensed by one of these large area sensors. During an interframe or nonproduction period, the LED's may be sequentially illuminated one after the other. Light from that LED is sensed by the sensor and since only one LED is on at any one time, the amount of light sensed corresponds to the output of that LED and suitable correction can be provided if needed. This approach is desirable where, because of differences in thermal expansion between an LED array and a CCD array, the CCD corresponding to one LED may instead receive light from a different LED.

Although the invention has been described with reference to control of the LED's, other light emitters such as PZLT, liquid crystal, etc. may also benefit from the teachings described herein. In addition, while the invention is described in terms of a grey level printer, the teachings described herein are also useable with binary printers where, for example, a single data bit determines if an emitter is to be turned on and if so multiple bits of data are used to represent exposure duration per pixel or some other means determines corrected exposure duration.

With the print apparatus and method of printing described herein, improved control of printing is provided with the sensors being positioned at the focal plane of the imaging lens. The control system thereby can adjust light output in response to nonuniformities of the imaging lens as well as due to changes in the emitter itself. The sensor is spaced from the printhead which is a source of heat and this is particularly advantageous where the sensors themselves exhibit thermal sensitivity. In addition, uniformity correction can actually be provided during the activity of printing a real page.

Although the above detailed description has been made with particular reference to a preferred embodiment, it will be understood that variations and modifications can be effected within the spirit and scope of the present invention.

I claim:
1. A non-impact printer apparatus comprising:
   a plurality of light-emitting elements for emitting light for recording images in response to respective currents passing there through;
   a photosensitive image recording member responsive to light from said elements for recording images;
   lens means for focusing light from said emitters to the photosensitive image recording member;
   means for generating image data signals;
   means responsive to the image data signals for energizing the recording elements and controlling the level of current to and the duration for recording a picture element by each recording element to record images on the recording member;
   sensor means for sensing a portion of light emitted by said elements during their recording of picture elements on said recording member and generating signals in response thereto; and
   control means responsive to said signals of said sensor means for adjusting the level of current to said recording elements for recording subsequent picture elements.

2. A non-impact printer apparatus comprising:
   a plurality of light-emitting elements for emitting light for recording images in response to respective currents passing there through;
   a photosensitive image recording member responsive to light from said elements for recording images;
   lens means for focusing light from said emitters to the photosensitive image recording member;
   means for generating image data signals;
   means responsive to the image data signals for energizing the recording elements and controlling the level of current to and the duration for recording a picture element by each recording element to record images on the recording member;

sensor means for sensing a portion of light emitted by said elements during their recording of picture elements on said recording member and generating signals in response thereto; and control means responsive to said signals of said sensor means for adjusting the duration for recording subsequent picture elements by said recording elements.

3. The apparatus according to claim 2, wherein the control means modifies data signals for recording a picture element to adjust the duration for recording the picture element.

4. The apparatus of claim 1 or 2 and wherein a mirror means is positioned in an exposure light path between light-emitting elements and the film and a portion of the light from an emitter is reflected from the mirror means to the sensor means and another portion of the light from an emitter is transmitted to the film.

5. The apparatus of claims 31 or 32 including a reference current source, and said sensor means adjusting the current in said reference current source in response to a determination that a majority of the emitters on said printer apparatus require adjustment in response to light sensed by said sensor means and driver means for driving said light-emitting elements in response to the reference current.

6. The apparatus of claim 5 including means for adjusting an exposure duration of said emitters requiring adjustment of light output.

7. The apparatus of claim 6 including comparator means for comparing a time-changing count with a multibit data signal related to an exposure time period.

8. The apparatus of claim 7 including memory means for translating a data signal to a multibit data signal related to a corrected exposure time period for a light-emitting element.

9. The apparatus of claim 8 wherein the data signal is a multibit grey level data signal and the said multibit data signal includes more data bits than the said multibit grey level data signal.

10. A non-impact printer apparatus, comprising:
a plurality of light-emitting recording elements;
a recording member for recording light emitted by said elements;
first and second mirrors located at an angle relative to each other and blocking a direct light path between said recording elements and said recording member;
a roof mirror assembly means for reflecting light reflected from said first mirror to the second mirror; and
lens means located between the roof mirror assembly means and at least one of said first and second mirrors for focusing light for recording on said recording member.

11. The printer apparatus of claim 10 and including sensor means for sensing a portion of the light output of the elements by sensing light transmitted through one of said first and second mirrors.

12. The printer apparatus of claim 11 and wherein the sensor means and the recording member are located at the focal plane of the lens means.

13. The printer apparatus of claim 12 and wherein the lens means is located in the path of light reflected from the first mirror to the roof mirror assembly and in the path of light reflected from said roof mirror assembly to said second mirror.

14. The printer apparatus of claim 13 and wherein the sensor means includes means for adjusting the light output of the elements in response to the light sensed.

15. A non-impact printer apparatus, comprising:
a plurality of light-emitting recording elements;
a recording member for recording light emitted by said elements;
first and second mirrors located at an angle relative to each other, said first mirror reflecting a portion of the light from said light-emitting elements to the second mirror and transmitting a portion of the light to the recording member;
a gradient index lens array between said first mirror and said recording elements to focus light from the recording elements; and
sensor means for sensing the light reflected from said second mirror.

16. The printer apparatus of claim 15 and wherein the sensor means and the recording member are located at the focal plane of the lens means.

17. The printer apparatus of claim 16 and wherein the sensor means includes means for adjusting the light output of the elements in response to the light sensed.

18. In a non-impact printer apparatus including a plurality of light-emitting elements, lens means for focusing light from said emitters to a photosensitive recording member, a photosensitive recording member located at a focal plane of the lens means, sensor means for sensing the light output of the elements and for adjusting the light output of the elements in response to the light sensed and the improvement comprising wherein the sensor means is also located at the focal plane of the lens means; wherein the lens means comprises a first gradient index lens array and a second gradient index lens array, and wherein the second gradient index lens array is positioned to focus light not collected by said first gradient index lens array onto said sensor means.

19. The apparatus of claim 18 wherein the mirror means comprises a roof mirror with one leg thereof having a partial transmission capability and the other leg thereof being fully reflective to light of the emitters.

20. The apparatus of claim 19 wherein the lens means comprises a gradient index lens array.

21. The apparatus of claim 18 wherein the light-emitting elements are light-emitting diodes.

22. A method of printing employing a plurality of light-emitters for recording on a photosensitive recording member, said method comprising the steps of:
generating electrical currents to selectively energize said light emitters for emitting light for producing a recording on said recording member;
imaging light from said emitters onto the recording member;
simultaneously imaging light from the same emitters used for recording upon a light-sensing means and generating signals related to the light sensed by said sensing means; and
in response to these signals adjusting the level of current and duration of a subsequent exposure period for energizing an emitter.

23. The method of claim 22 including the step of adjusting the level of current by adjusting a reference current source.

24. The method of claim 23 including the step of determining exposure duration by comparing a time changing count with a multibit data signal related to an exposure time period.

25. The method of claim 24 including the step of translating a data signal to a multibit data signal related to a corrected exposure time period for a light-emitting element.

26. The method of claim 25 wherein the data signal is a multibit grey level data signal and the said multibit data signal includes more data bits than the said multibit grey level data signal.

27. The method of claim 22 wherein light from said emitters is focused onto the recording member by a lens means and the light-sensing means is located at the focal plane of the lens means.

28. A method of printing employing a plurality of light-emitters for recording on a photosensitive recording member, said method comprising the steps of:
  generating electrical currents to selectively energize said light emitters during an exposure period for emitting light for producing a recording on said recording member;
  imaging light from said emitters onto the recording member for recording;
  determining exposure duration by comparing a time-changing count with a multibit data signal related to an exposure time period;
  simultaneously during said exposure period imaging light from said emitters upon a light-sensing means and generating signals related to the amount of light sensed by said sensing means; and
  in response to the signals sensed by said sensing means adjusting an operating parameter for recording with said emitters during a subsequent recording period.

29. The method of claim 28 including the step of adjusting the level of current by adjusting a reference current source.

30. The method of claim 29 including the step of translating a data signal to a multibit data signal related to a corrected exposure time period for a light-emitting element.

31. The method of claim 30 wherein the data signal is a multibit grey level data signal and the said multibit data signal includes more data bits than the said multibit grey level data signal.

32. The method of claim 28 wherein light from said emitters is focused onto the recording member by a lens means and the light-sensing means is located at the focal plane of the lens means.

33. The method of claim 28 and including the step of sensing light from the emitters during a plurality of image recording periods and using such plural readings to determine an operating parameter for recording with said emitters during a subsequent recording period.

* * * * *